Patented July 20, 1937

2,087,264

UNITED STATES PATENT OFFICE 2,087,264

PROCESS OF CLARIFYING WATER IN CONNECTION WITH SOFTENING

Benjamin Poisner, North Kansas City, Mo., assignor to Economy Laboratories Co., North Kansas City, Mo., a corporation of Missouri No Drawing. Application May 6, 1936, Serial No. 78,246

7 Claims. (Cl. 210—23)

The present invention relates to purifying water and particularly to the coagulation of precipitates produced in industrial water which is being treated to render the same suitable for use as boiler feed water. The invention will be particularly described in connection with the coagulation of the precipitates produced in the lime-soda ash process of water purification, which process is well known and extensively practiced. The lime-soda ash process consists essentially in adding to the raw water, enough lime to precipitate the temporary hardness (hardness caused by calcium and magnesium bicarbonates) followed by the addition of enough soda ash to precipitate the permanent hardness (hardness produced by the presence of calcium sulphate and other soluble calcium and magnesium salts). This leaves in the water precipitates of calcium carbonate, magnesium carbonate and the like, together with (in some cases) colloidal matter, organic matter in suspension, and sometimes other substances precipitated by the reagents mentioned above.

Settling out of the precipitates is frequently more or less slow, and might require a long period of time, if nothing were added to accelerate the settlement or coagulation of the finely suspended matter.

Heretofore sodium aluminate has been frequently employed for coagulation of the said precipitated matter, but the acceleration produced thereby is in many cases not sufficient, for the reason that the aluminum hydroxide itself is a substance of relatively low specific gravity. In accordance with the present invention, I add sodium zincate at this stage, or at any event a material containing sodium zincate or an alkali-metal zincate as a substantial component. The sodium zincate is preferably used in the form of a relatively concentrated aqueous solution, containing more or less free alkali. The amount of the zincate solution to be added will determine the speed of the coagulation of the suspended matter.

In ordinary practice I find it most advisable to use a solution of sodium zincate, of about 25% strength, also containing about 10 to 15% of excess caustic soda. An amount of this solution equal to about two-tenths to thirty-three one hundredths pounds of the said solution per thousand gallons of water treated is generally most satisfactory, although the invention is not, in its broader aspect, restricted to these particular amounts. The amounts of solution just stated would correspond approximately to 0.05 pound to 0.08 pound of actual sodium zincate per 1000 gallons of water treated.

The sodium zincate solution can be made by various methods, a wholly satisfactory method being to dissolve a zinc compound such as zinc oxide, zinc sulphate, zinc chloride, or metallic zinc or other suitable substance containing zinc in a solution of caustic soda. The solution may for example be produced by dissolving from 2 to 15 pounds of zinc oxide in a solution of from 20 to 40 pounds of caustic soda, in sufficient water to make 100 pounds of solution. Where desired, aluminum hydrate up to 8 pounds, and sodium chromate up to 2 pounds can also be added. The sodium chromate referred to is an oxidation inhibitor, to prevent oxidation or rusting of metallic tanks or receptacles into which the water is conducted. The use of aluminum hydrate by itself is not claimed herein, but the use of aluminum hydrate in conjunction with the zincate solution is in some cases advantageous, for giving a more complete and/or more rapid coagulation of the suspended matters. The particular concentration of the zincate solution is largely a matter of expediency. It is not possible by ordinary methods to produce solutions much stronger than 25% concentration, and it is desired to use the zincate solution as concentrated as possible, in order to save on freight where the solutions have to be shipped for long distances.

In a preferred method of producing the zincate solution, I preferably proceed as follows:—30 pounds of caustic soda are dissolved in an equal weight of water, and then 7 to 7.5 pounds of zinc oxide are added to this concentrated caustic soda solution, and the solution is heated sufficiently to dissolve the zinc oxide. To this solution 5 pounds of aluminum hydrate can be added if desired, together with 1 to 2 pounds of sodium chromate. Or the sodium chromate can be used without the aluminum hydrate. The solution can subsequently be diluted to about 80 to 100 pounds, producing a stable solution.

I desire it understood that the present invention does not include the addition of any of the materials above stated, into water in a boiler or water being introduced into a boiler, for the reason that sodium zincate in a boiler is objectionable. The sodium zincate, when added to the large amount of industrial water under treatment, hydrolyzes to give a precipitate of hydrated zinc oxide or zinc hydroxide, which acts as a coagulant, to remove the suspended matter from the water by sedimentation, and the added sodium zincate is substantially completely hydrolyzed, in this process, as is thereby substantially completely gotten rid of before the water is drawn off clear, to be introduced into a boiler or into other processes in which the water may subsequently used. It will be understood that in place of caustic soda, an equal molecular amount of caustic potash can be employed, but apparently without any specific advantage.

In the lime-soda-ash process of softening water, the amounts of lime and of soda ash (sodium carbonate) to be added, vary between wide limits, because these are added in the amounts stoichiometrically equivalent to the temporary and permanent hardness, respectively, of the water under treatment. In ordinary cases however, several pounds of the lime and several pounds of the soda ash will be used, to each 1000 gallons of water. Irrespective of the amounts of the lime and soda ash, 1/20 to 1/12 pound of alkali-zincate (figured as actual sodium zincate) will be sufficient.

I am aware that it has been proposed to introduce relatively great amounts of sodium zincate (in solution) into the water in boilers or into the feed water for boilers, but such an operation now appears to be definitely injurious. In my process the zincate is not introduced into boilers nor into the feed water going into boilers. But the zincate is added to the water while the latter is cold, warm or hot, (usually cold) in the water purification plant, and the zincate all hydrolyzes and decomposes in the water while still in the water purification plant, never coming into the boiler.

In the modification above described, the zincate is added after (preferably just after) the lime and soda ash, but it can be added simultaneously with the soda ash.

It is sometimes considered advantageous to add the lime, soda ash and coagulant simultaneously, to the water under treatment, either through separate feed lines or as a mixture. Adding these as a mixture, in continuous flow systems means that it is necessary only to control two inlet lines, i. e. the water inlet and the inlet for the mixture of chemicals.

In batch processes, I would recommend first mixing in the lime, then mixing in the soda, and then mixing in the coagulant (sodium zincate solution) and then settling.

Addition of the zincate just after the soda ash or simultaneously therewith, seems to be the preferred modification.

I have above referred to the use of the treated water in boilers. It can also be used for many other industrial purposes, including use in laundries, dye houses, rayon factories, or any place where soft water is desired.

I claim:—

1. A process of treating industrial water containing at least one dissolved compound of a metal selected from the group consisting of calcium and magnesium, to render the said water suitable as feed water to boilers and other analogous purposes, which comprises acting upon the hardness in said water with at least one water-softening chemical to precipitate therein insoluble compounds of the impurities which cause hardness; and while said insoluble compounds are in suspension in the water, adding a soluble hydrolytically dissociable zincate of an alkali thereto, which zincate can undergo hydrolysis in said water to liberate a hydrated zinc oxide in said water, and allowing sedimentation of the said insoluble compounds and said hydrated zinc oxide, whereby such sedimentation is accelerated, and separating the clarified water from said insoluble compounds and hydrated zinc oxide, prior to use.

2. Process as in claim 1, in which the water softening is accomplished by the lime-soda-ash process.

3. A process of treating industrial water containing at least one dissolved compound of a metal selected from the group consisting of calcium and magnesium, to render the said water suitable as feed water to boilers and other analogous purposes, which comprises first acting upon the hardness in said water with at least one water-softening chemical to precipitate therein insoluble compounds of the impurities which cause hardness; and while said insoluble compounds are in suspension in the water, adding thereto a concentrated solution of sodium zincate, which zincate can undergo hydrolysis in said water to liberate a hydrated zinc oxide in said water, and allowing sedimentation of the said insoluble compounds and said hydrated zinc oxide, whereby such sedimentation is accelerated, and separating the clarified water from said insoluble compounds and hydrated zinc oxide, prior to use.

4. A process as in claim 1, in which the amount of the zincate is a small fraction only of the amount of the water purifying chemical.

5. A process as in claim 1, in which the amount of the zincate added is between about .05 and about .08 pound per 1000 gallons of the water treated.

6. In the art of purifying industrial water to an extent suitable for use as boiler feed water, and in which any calcium and magnesium in the industrial water are precipitated by the addition of water-softening chemicals, at least a part of the precipitate so formed existing as intensely fine precipitates of calcium and magnesium salts which will naturally settle only very slowly, the herein described improvement which consists in accelerating coagulation and settlement of such fine precipitates by adding to the said water, in bulk, an alkali-zincate in amount corresponding to a very minor fraction of a pound per 1000 gallons of water, and separating the clarified water from said insoluble compounds and hydrated zinc oxide, prior to use.

7. A process as in claim 6, in which the amount of said zincate is equal to about 0.05 to 0.08 lb. per 1000 gallons of said water, whereby substantially all of the zinc is precipitated and removed from the water, during the purification thereof.

BENJAMIN POISNER.